United States Patent
Yamamoto et al.

[11] 3,903,091
[45] Sept. 2, 1975

[54] 1,2,3,4-TETRAHYDROISOQUINOLINE DERIVATIVES

[75] Inventors: Hisao Yamamoto, Nishinomiya; Masaru Nakao; Kikuo Sasajima, both of Toyonaka; Isamu Maruyama, Minoo; Shigenari Katayama, Takarazuka, all of Japan

[73] Assignee: Sumitomo Chemical Company, Ltd., Osaka, Japan

[22] Filed: May 15, 1972

[21] Appl. No.: 253,547

Related U.S. Application Data

[63] Continuation-in-part of Ser. No. 109,929, Jan. 26, 1971, abandoned.

[30] Foreign Application Priority Data

| Feb. 6, 1970 | Japan | 45-10924 |
| Feb. 6, 1970 | Japan | 45-10928 |
| Feb. 9, 1970 | Japan | 45-11628 |
| Apr. 21, 1970 | Japan | 45-34455 |
| Apr. 21, 1970 | Japan | 45-34456 |
| Nov. 28, 1970 | Japan | 45-105104 |

[52] U.S. Cl. ............ 260/288 D; 204/75; 260/141; 260/283 CN; 260/286 R; 260/287; 260/288 CE; 260/289 D; 260/471 R; 260/473 R; 260/476 R; 260/687; 424/258

[51] Int. Cl. ............................................. C07d 35/36

[58] Field of Search ............ 260/289 R, 288 R

[56] References Cited
UNITED STATES PATENTS

| 3,328,390 | 6/1967 | Grogan | 260/289 R |
| 3,450,704 | 6/1969 | Osbond et al. | 260/289 R |

FOREIGN PATENTS OR APPLICATIONS

| 1,183,349 | 3/1970 | United Kingdom | 260/289 |
| 4,637 | 10/1964 | France | 260/289 |
| 5,990 | 11/1966 | France | 260/289 |
| 649,952 | 7/1973 | Belgium | 260/289 |
| 190,517 | 7/1957 | Austria | 260/289 R |

OTHER PUBLICATIONS

Grogan et al., J. Med. Chem., 10, 2/18/67, pp. 621–623.

*Primary Examiner*—Donald G. Daus
*Assistant Examiner*—Mary C. Vaughn
*Attorney, Agent, or Firm*—Stevens, Davis, Miller & Mosher

[57] ABSTRACT

1,2,3,4-Tetrahydroisoquinoline derivatives having excellent psychotropic activity and represented by the formula,

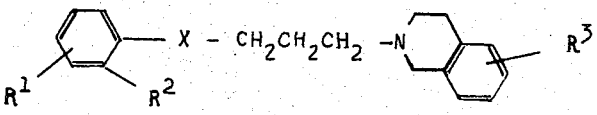

wherein X is 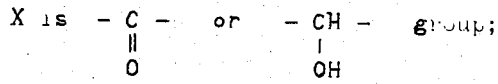 group;

$R^1$ is hydrogen, halogen, $C_1$–$C_3$ alkyl, $C_1$–$C_3$ alkoxy or trifluoromethyl;

$R^2$ is hydrogen, halogen, amino, $C_1$–$C_3$ alkylamino, N-($C_1$–$C_3$ alkyl)acylamino or acylamino;

$R^3$ is hydrogen, halogen, $C_1$–$C_3$ alkyl, $C_1$–$C_3$ alkoxy, hydroxy or trifluoromethyl, and processes for the production of the same.

2 Claims, No Drawings

1,2,3,4-TETRAHYDROISOQUINOLINE DERIVATIVES

This is a Continuation-in-Part application of the U.S. Ser. No. 109,929 filed on Jan. 26, 1971 and now abandoned.

The present invention relates to novel N-substituted 1,2,3,4-tetrahydroisoquinoline derivatives useful as medicines and intermediates for medicines and to processes for the production of the same.

More particularly, the present invention relates to novel N-substituted 1,2,3,4-tetrahydroisoquinoline derivatives, which have excellent central nervous system activity and are important intermediates for producing psychotropic drugs, and to advantageous processes for the production of the same.

The present inventors found that novel N-substituted 1,2,3,4-tetrahydroisoquinoline derivatives, having anti-anxiety, anti-psychotonic, anti-emotional, anti-convulsive, anti-psychosis, sedative, analgesic or anti-hypertensive activities, can be prepared by novel or known-type processes.

Accordingly, the first object of the present invention is to provide novel central nervous system active N-substituted 1,2,3,4-tetrahydroisoquinoline derivatives.

Another object is to provide an advantageous process for producing the said isoquinoline derivatives.

A further object is to provide a pharmaceutical use of the said isoquinoline derivatives.

Other objects and merits of the invention will be apparent from the following description.

The present invention provides N-substituted 1,2,3,-4-tetrahydroisoquinoline derivatives represented by the formula,

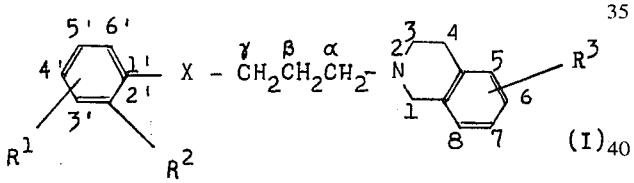

wherein

X is $-\underset{\underset{O}{\|}}{C}-$ or $-\underset{\underset{OH}{|}}{CH}-$ group;

$R^1$ is hydrogen, halogen, $C_1-C_3$ alkyl, $C_1-C_3$ alkoxy or trifluoromethyl;

$R^2$ is hydrogen, halogen, amino, $C_1-C_3$ alkylamino, N-($C_1-C_3$ alkyl)acylamino or acylamino;

$R^3$ is hydrogen, halogen, $C_1-C_3$ alkyl, $C_1-C_3$ alkoxy, hydroxy or trifluoromethyl, and acid addition salts thereof.

Further, the present invention provides a process for producing an N-substituted 1,2,3,4-tetrahydroisoquinoline derivative represented by the formula (I) or an acid addition salt thereof, which comprises reacting an N-(β-benzoylpropionyl)-1,2,3,4-tetrahydroisoquinoline derivative of the formula,

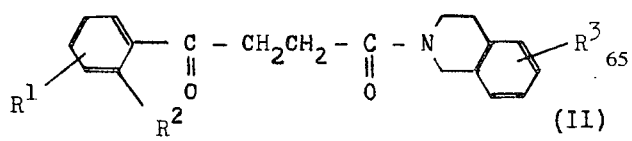

wherein $R^1$, $R^2$ and $R^3$ have the same meanings as defined above, with a reducing agent to form an N-(δ-hydroxy-δ-phenylbutyl)-1,2,3,4-tetrahydroisoquinoline derivative of the formula,

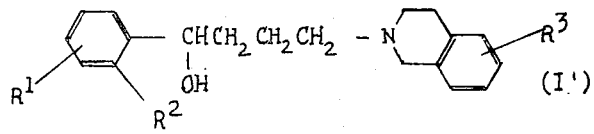

wherein $R^1$, $R^2$ and $R^3$ have the same meanings as defined above, and, if desired, then reacting the obtained compound of the formula (I′) or an acid addition salt thereof with an oxidizing agent to form an N-(γ-benzoylpropyl)-1,2,3,4-tetrahydroisoquinoline derivative of the formula,

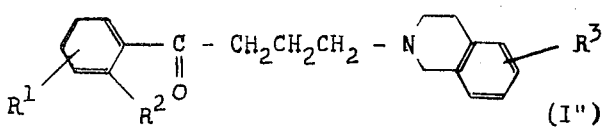

wherein $R^1$, $R^2$ and $R^3$ have the same meanings as defined above.

The reduction, the first step of the process, is effected in a suitable organic solvent using various reducing agents. Examples of preferable reducing agents include metal hydride complexes, and particularly preferred ones are lithium aluminum hydride, diborane and sodium borohydride-aluminum chloride. While the reducing agent can be used in a stoichiometric amount or more, the objective compound (I′) is obtained generally in high yields. The reaction is conducted at a temperature within a range of 0°C to the boiling point of a solvent, preferably 10° to 100°C.

The metal hydride complex reduction in the present process is carried out in a solvent such as, for example, diethyl ether, di-n-butyl ether, tetrahydrofuran, dioxane, methylal, N-ethylmorpholine, ethylene glycol dimethyl ether, diethylene glycol dimethyl ether, etc.

After the reaction is complete, the excess reducing agent used and the complex compound formed are decomposed by addition of water, an alcohol, ethyl acetate or the like, and then the objective compound can be isolated and, if neceessary, further purified by recrystallization, etc. If desired, the product can be converted into an acid addition salt thereof by the treatment with a mineral or organic acid. The said salt can be formed with, for example, hydrochloric, sulfuric, phosphoric, hydrobromic, thiocyanic, acetic, propionic, oxalic, citric, malic, tartaric, fumaric, maleic, succinic, glycolic, benzoic, cinnamic, p-aminosalicyclic, salicyclic, methanesulfonic, and ascorbic acids, etc.

By the above-mentioned procedure, the compounds of the formula (I′) are obtained in high yields, examples of which are as follows:

2-[δ-(4-Fluorophenyl)-δ-hydroxybutyl]-1,2,3,4-tetrahydroisoquinoline

2-[δ-(4-Fluorophenyl)-δ-hydroxybutyl]-5-chloro-1,2,3,4-tetrahydroisoquinoline

2-[δ-(4-Fluorophenyl)-δ-hydroxybutyl]-6-chloro-1,2,3,4-tetrahydroisoquinoline

2-[δ-(4-Fluorophenyl)-δ-hydroxybutyl]-7-chloro-1,2,3,4-tetrahydroisoquinoline

2-[δ-(4-Fluorophenyl)-δ-hydroxybutyl]-8-chloro-1,2,3,4-tetrahydroisoquinoline
2-[δ-(4-Fluorophenyl)-δ-hydroxybutyl]-6-bromo-1,2,3,4-tetrahydroisoquinoline
2-[δ-(4-Fluorophenyl)-δ-hydroxybutyl]-6-methyl-1,2,3,4-tetrahydroisoquinoline
2-[δ-(4Fluorophenyl)-δ-hydroxybutyl]-6-isopropyl-1,2,3,4-tetrahydroisoquinoline
2-[δ-(4-Fluorophenyl)-δ-hydroxybutyl]-6-methoxy-1,2,3,4-tetrahydroisoquinoline
2-[δ-(4-Fluorophenyl)-δ-hydroxybutyl]-6-isopropoxy-1,2,3,4-tetrahydroisoquinoline
2-[δ-(4-Fluorophenyl)-δ-hydroxybutyl]-6-hydroxy-1,2,3,4-tetrahydroiosquinoline
2-[δ-(4-fluorophenyl)-δ-hydroxybutyl]-5-hydroxy-1,2,3,4-tetrahydroisoquinoline
2-[δ-(4-Fluorophenyl)-δ-hydroxybutyl]-6-trifluoromethyl-1,2,3,4-tetrahydroisoquinoline
2-[δ-(4-Chlorophenyl)-δ-hydroxybutyl]-1,2,3,4-tetrahydroisoquinoline
2-[δ-(4-Bromophenyl)-δ-hydroxybutyl]-1,2,3,4-tetrahydroisoquinoline
2-[δ-(p-Tolyl)-δ-hydroxybutyl]-1,2,3,4-tetrahydroisoquinoline
2-[δ-(4-Isopropylphenyl)-δ-hydroxybutyl]-1,2,3,4-tetrahydroisoquinoline
2-[δ-(4-Methoxyphenyl)-δ-hydroxybutyl]-1,2,3,4-tetrahydroisoquinoline
2-[δ-(4-Isopropoxyphenyl)-δ-hydroxybutyl]-1,2,3,4-tetrahydroisoquinoline
2-[δ-(4-Trifluoromethylphenyl)-δ-hydroxybutyl]-1,2,3,4-tetrahydroisoquinoline
2-[δ-(2-Chloro-4-fluorophenyl)-δ-hydroxybutyl]-1,2,3,4-tetrahydroisoquinoline
2-[δ-(2,4-Difluorophenyl)-δ-hydroxybutyl]-1,2,3,4-tetrahydroisoquinoline The oxidation, the second step of the process, is effected in a suitable solvent using various oxidizing agents.

Examples of the oxidizing agents used in the present process include manganese dioxide, chromic acid, chromates, oxygen, ozone, dimethyl sulfoxide, potassium permanganate, osmium oxide, and organic peracids. There may also be employed Oppenauer oxidation or photooxidation. The reaction is generally carried out in water or in an organic solvent at a temperature of 0° to 40°C, and lower or higher temperatures may be used. Examples of the organic solvents used in the present oxidation include petroleum ether, ether, chloroform, carbon tetrachloride, benzene, acetic acid, acetone, pyridine, ethyl acetate, etc.

The resulting objective compound of the general formula (I'') can be converted, if necessary, into an acid addition salt thereof by treatment, as in the first step, with a mineral or organic acid.

By the above-mentioned procedure, there are synthesized, for example, the following compounds:
2-[δ-(4-Fluorobenzoyl)propyl]-1,2,3,4-tetrahydroisoquinoline
2-[δ-(4-Fluorobenzoyl)propyl]-5-chloro-1,2,3,4-tetrahydroisoquinoline
2-[δ-(4-Fluorobenzoyl)propyl]-6-chloro-1,2,3,4-tetrahydroisoquinoline
2-[δ-(4-Fluorobenzoyl)propyl]-7-chloro-1,2,3,4-tetrahydroisoquinoline
2-[δ-(4-Fluorobenzoyl)propyl]-8-chloro-1,2,3,4-tetrahydroisoquinoline
2-[δ-(4-Fluorobenzoyl)propyl]-6-bromo-1,2,3,4-tetrahydroisoquinoline
2-[δ-(4-Fluorobenzoyl)propyl]-6-methyl-1,2,3,4-tetrahydroisoquinoline
2-[δ-(4-Fluorobenzoyl)propyl]-6-isopropyl-1,2,3,4-tetrahydroisoquinoline
2-[δ-(4-Fluorobenzoyl)propyl]-6-methoxy-1,2,3,4-tetrahydroisoquinoline
2-[δ-(4-Fluorobenzoyl)propyl]-6-isopropoxy-1,2,3,4-tetrahydroisoquinoline
2-[δ-(4-Fluorobenzoyl)propyl]-6-hydroxy-1,2,3,4-tetrahydroisoquinoline
2-[δ-(4-Fluorobenzoyl)propyl]-5-hydroxy-1,2,3,4-tetrahydroisoquinoline
2-[δ-(4-Fluorobenzoyl)propyl]-6-trifluoromethyl-1,2,3,4-tetrahydroisoquinoline
2-[δ-(4-Fluorobenzoyl)propyl]-7-methoxy-1,2,3,4-tetrahydroisoquinoline
2-[δ-(4-Chlorobenzoyl)propyl]-1,2,3,4-tetrahydroisoquinoline
2-[δ-(4Methylbenzoyl)propyl]-1,2,3,4-tetrahydroisoquinoline
2-[δ-(4-Methoxybenzoyl)propyl]-1,2,3,4-tetrahydroisoquinoline
2-[δ-(4-Trifluoromethylbenzoyl)propyl]-1,2,3,4-tetrahydroisoquinoline
2-[δ-(2-Chloro-4-Fluorobenzoyl)propyl]-1,2,3,4-tetrahydroisoquinoline
2(δ-Benzoylpropyl)-1,2,3,4-tetrahydroisoquinoline
2-[δ-(4-Isopropoxybenzoyl)propyl]-1,2,3,4-tetrahydroisoquinoline
2-[δ-(4-Isopropylbenzoyl)propyl]-1,2,3,4-tetrahydroisoquinoline The compounds of the formula (II), which are the starting materials of the present process, are readily prepared using easily available materials by, for example, the following reaction scheme:

$$R^1\text{-}C_6H_3\text{-}R^2\text{-}C(=O)\text{-}CH_2CH_2COOH + Cl\text{-}COOC_2H_5 \quad (III)$$

$$\xrightarrow{(C_2H_5)_3N} R^1\text{-}C_6H_3\text{-}R^2\text{-}C(=O)\text{-}CH_2CH_2\text{-}C(=O)\text{-}O\text{-}C(=O)\text{-}OC_2H_5$$

$$\xrightarrow{HN\text{-}(IV)\text{-}R^3}$$

$$R^1\text{-}C_6H_3\text{-}R^2\text{-}C(=O)\text{-}CH_2CH_2\text{-}C(=O)\text{-}N\text{-}R^3 \quad (II)$$

(In the above formulae, R¹, R² and R³ have the same meanings as defined above.)

The present invention also provides a process for producing an N-substituted 1,2,3,4-tetrahydroisoquinoline derivative represented by the formula (I″), or an acid addition salt thereof, which comprises reacting a Grignard reagent of the formula,

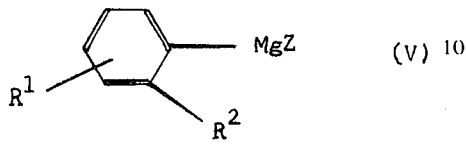

wherein

Z is halogen; R¹ and R² have the same meanings as defined above, with a compound of the formula,

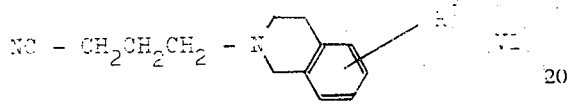

wherein R³ has the same meaning as defined above, and then hydrolyzing the reaction product to yield the objective compound of the formula (I″).

The Grignard reagent of the formula (V) can be prepared by a method well known in the art and the compound of the formula (VI) can also be readily prepared by, for example, a method as described in the following reaction scheme:

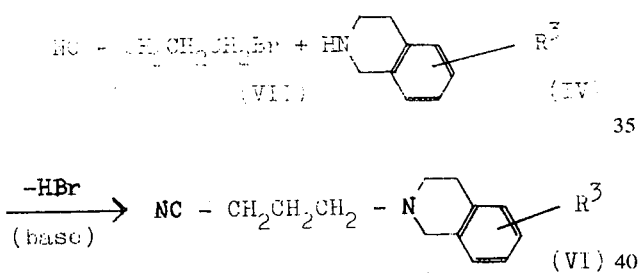

(In the above formulae, R³ has the same meaning as defined above.)

The Grignard reaction of the process is conducted under usual Grignard conditions, and there are obtained, for example, the following compounds.

2-[δ-(4-Fluorobenzoyl)propyl]-1,2,3,4-tetrahydroisoquinoline
2-[δ-(4-Fluorobenzoyl)propyl]-5-chloro-1,2,3,4-tetrahydroisoquinoline
2-[δ-(4-Fluorobenzoyl)propyl]-6-chloro-1,2,3,4-tetrahydroisoquinoline
2-[δ-(4-Fluorobenzoyl)propyl]-7-chloro-1,2,3,4-tetrahydroisoquinoline
2-[δ-(4-Fluorobenzoyl)propyl]-8-chloro-1,2,3,4-tetrahydroisoquinoline
2-[δ-(4-Fluorobenzoyl)propyl]-6-bromo-1,2,3,4-tetrahydroisoquinoline
2-[δ-(4-Fluorobenzoyl)propyl]-6-methyl-1,2,3,4-tetrahydroisoquinoline
2-[δ-(4-Fluorobenzoyl)propyl]-6-isopropyl-1,2,3,4-tetrahydroisoquinoline
2-[δ-(4-Fluorobenzoyl)propyl]-6-methoxy-1,2,3,4-tetrahydroisoquinoline
2-[δ-(4-Fluorobenzoyl)propyl]-6-isopropoxy-1,2,3,4-tetrahydroisoquinoline
2-[δ-(4-Fluorobenzoyl)propyl]-6-hydroxy-1,2,3,4-tetrahydroisoquinoline
2-[δ-(4-Fluorobenzoyl)propyl]-5-hydroxy-1,2,3,4-tetrahydroisoquinoline
2-[δ-(4-Fluorobenzoyl)propyl]-6-trifluoromethyl-1,2,3,4-tetrahydroisoquinoline
2-[δ-(4-Fluorobenzoyl)propyl]-7-methoxy-1,2,3,4-tetrahydroisoquinoline
2-[δ-(4Chlorobenzoyl)propyl]-1,2,3,4-tetrahydroisoquinoline
2-[δ-(4Methylbenzoyl)propyl]-1,2,3,4-tetrahydroisoquinoline
2-[δ-(4Methoxybenzoyl)propyl]-1,2,3,4-tetrahydroisoquinoline
2-[δ-(4-Trifluoromethylbenzoyl)propyl]-1,2,3,4-tetrahydroisoquinoline
2-[δ-(2-Chloro-4-fluorobenzoyl)propyl]-1,2,3,4-tetrahydroisoquinoline
2-(δ-Benzoylpropyl)-1,2,3,4-tetrahydroisoquinoline
2-[δ-(4-Isopropoxybenzoyl)propyl]-1,2,3,4-tetrahydroisoquinoline
2-[δ-(4-Isopropylbenzoyl)propyl]-1,2,3,4-tetrahydroisoquinoline The present invention also provides a process for producing an N-substituted 1,2,3,4-tetrahydroisoquinoline derivative represented by the formula (I′), or an acid addition salt thereof, which comprises reacting a compound of the formula,

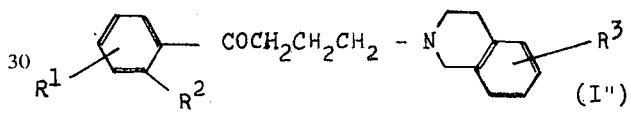

wherein R¹, R² and R³ have the same meanings as defined above, with a reducing agent. There are used various reducing agents in the process and the most preferable one is metal hydride complex compound, especially sodium borohydride.

The reaction, where sodium borohydride is used, is carried out in a solvent such as water, ethanol, isopropanol, tetrahydrofuran, dioxane, diethylene glycol dimethyl ether and the like at a temperature between 10° and 120°C. The following compounds, for example, are easily prepared by this method.

2-[δ-(4-Fluorophenyl)-δ-hydroxybutyl]-5-chloro-1,2,3,4-tetrahydroisoquinoline
2-[δ-(4-Fluorophenyl)-δ-hydroxybutyl]-6-chloro-1,2,3,4-tetrahydroisoquinoline
2-[δ-(4-Fluorophenyl)-δ-hydroxybutyl]-7-chloro-1,2,3,4-tetrahydroisoquinoline
2-[δ-(4-Fluorophenyl)-δ-hydroxybutyl]-8-chloro-1,2,3,4-tetrahydroisoquinoline
2-[δ-(4-Fluorophenyl)-δ-hydroxybutyl]-6-bromo-1,2,3,4-tetrahydroisoquinoline
2-[δ-(4-Fluorophenyl)-δ-hydroxybutyl]-6-methyl-1,2,3,4-tetrahydroisoquinoline
2-[δ-(4-Fluorophenyl)-δ-hydroxybutyl]-6-isopropyl-1,2,3,4-tetrahydroisoquinoline
2-[δ-(4-Fluorophenyl)-δ-hydroxybutyl]-6-methoxy-1,2,3,4-tetrahydroisoquinoline
2-[δ-(4-Fluorophenyl)-δ-hydroxybutyl]-6-isopropoxy-1,2,3,4-tetrahydroisoquinoline
2-[δ-(4-Fluorophenyl)-δ-hydroxybutyl]-6-hydroxy-1,2,3,4-tetrahydroisoquinoline
2-[δ-(4-Fluorophenyl)-δ-hydroxybutyl]-5-hydroxy-1,2,3,4-tetrahydroisoquinoline
2-[δ-(4-Fluorophenyl)-δ-hydroxybutyl]-6-trifluoromethyl-1,2,3,4-tetrahydroisoquinoline 2-[δ-(4-Chlorophenyl)-δ-hydroxybutyl]-1,2,3,4-tetrahydroisoquinoline 2-[δ-(4-Bromophenyl)-δ-hydroxybutyl]-1,2,3,4-tetrahydroisoquinoline 2-[δ-(p-Tolyl)-δ-hydroxybutyl]-1,2,3,4-tetrahydroisoquinoline 2-[δ-(4-Isopropylphenyl)-δ-hydroxybutyl]-1,2,3,4-tetrahydroisoquinoline 2-[δ-(4-Methoxyphenyl)-δ-hydroxybutyl]-1,2,3,4-tetrahydroisoquinoline 2-[δ-(4-Isopropoxyphenyl)-δ-hydroxybutyl]-1,2,3,4-tetrahydroisoquinoline 2-[δ-(4-Trifluoromethylphenyl)-δ-hydroxybutyl]-1,2,3,4-tetrahydroisoquinoline 2-[δ-(2-Chloro-4-fluorophenyl)-δ-hydroxybutyl]-1,2,3,4-tetrahydroisoquinoline 2-[δ-(2,4-Difluorophenyl)-δ-hydroxybutyl]-1,2,3,4-tetrahydroisoquinoline Furthermore, the present invention provides a process for producing an N-(δ-benzoylpropyl)-1,2,3,4-tetrahydroisoquinoline derivative of the formula,

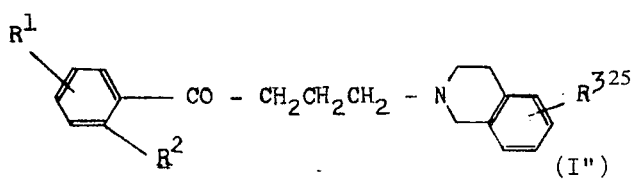

(I''')

wherein $R^1$, $R^2$ and $R^3$ have the same meanings as defined above, and an acid addition salt thereof, which comprises reacting an indole compound of the formula,

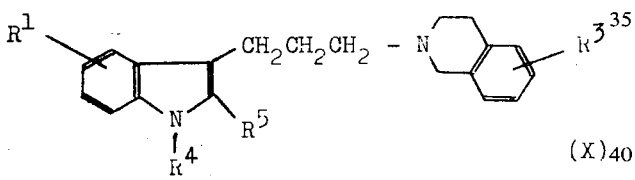

(X)

wherein $R^4$ and $R^5$ are hydrogen or $C_1$-$C_3$ alkyl respectively, and $R^1$ and $R^3$ have the same meanings as defined above, with an oxidizing agent to yield a compound of the formula,

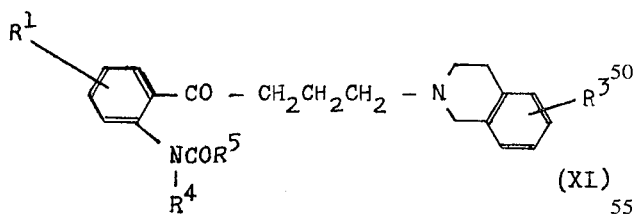

(XI)

wherein $R^1$, $R^3$, $R^4$ and $R^5$ have the same meanings as defined above, and if necessary, hydrolyzing the resulting compound of the formula (XI) to a compound of the formula,

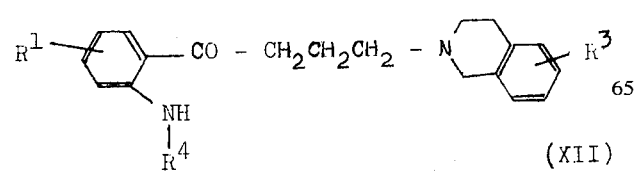

(XII)

wherein $R^1$, $R^3$ and $R^4$ have the same meanings as defined above, and further diazotizing, if desired, in case $R^4$ is hydrogen, the resulting compound of the formula (XII) and subsequently decomposing the resulting diazonium compound to replace the diazonium group by hydrogen or halogen to yield a compound of the formula,

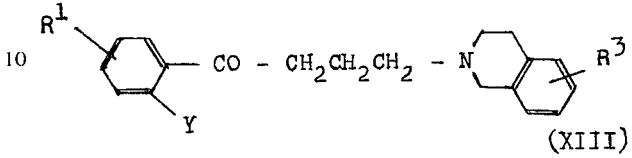

(XIII)

wherein Y is hydrogen or halogen; and $R^1$ and $R^3$ have the same meanings as defined above.

The indole compound of the formula (X), a starting material in the present process, is prepared by reduction of the corresponding 3-indolylpropionamide derivative of the formula,

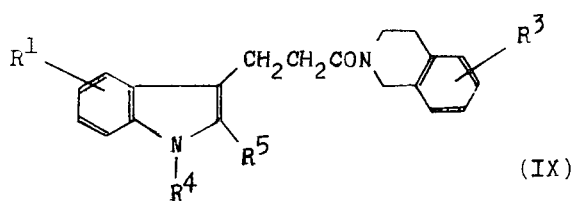

(IX)

wherein $R^1$, $R^3$, $R^4$ and $R^5$ have the same meanings as defined above, which can be prepared, for example, by reacting a 3-indolylpropionic acid derivative of the formula,

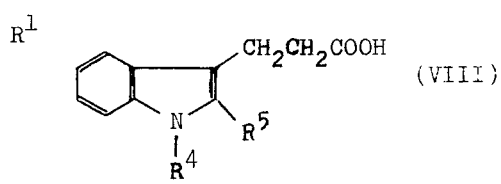

(VIII)

wherein $R^1$, $R^4$ and $R^5$ have the same meanings as defined above, or its functionally active derivative with a 1,2,3,4-tetrahydroisoquinoline derivative of the formula,

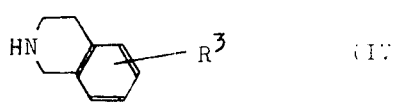

(IV)

wherein $R^3$ has the same meaning as defined above.

The N-[β-(3'-indolyl)propionyl]-1,2,3,4-tetrahydroisoquinoline derivative of the formula (IX), an intermediate in the present process, is prepared by reacting a 3-indolylpropionic acid derivative of the formula (VIII) or its functionally active derivative such as acid chloride, acid bromide, acid anhydride, mixed acid anhydride, p-nitrophenylester and the like, with a 1,2,3,4-tetrahydroisoquinoline derivative of the formula (IV).

The reaction is preferably carried out in the presence of a basic agent or a condensing agent such as pyridine, triethylamine, sodium carbonate, sodium hydroxide, ortho position of the benzoyl benzene ring, can be prepared by contacting the above-obtained N-[γ-(3'-indolyl)propyl]-1,2,3,4-tetrahydroisoquinoline of the formula (X) with an oxidizing agent. In the oxidative cleavage reaction, it is preferred to use an oxidizing agent such as ozone, hydrogen peroxide, performic acid, peracetic acid, perbenzoic acid, chromic acid or potassium permanganate, although the oxidizing agent used in the present process is not limited to the exemplified ones and others may be used.

Generally, the reaction progresses readily at room temperature, but the temperature may be higher or lower, if necessary, to effect the desired control of the reaction. The oxidizing agent is preferably chromic acid or ozone. The reaction is preferably effected in the presence of a solvent. The choice of solvent depends on the oxidizing agent employed, and is selected from the group consisting of water, acetone, carbon tetrachloride, acetic acid, sulfuric acid and the like. The oxidizing agent is used in the stoichiometric amount or more. The reaction temperature varies depending on the oxidizing agent employed.

Where the oxidation is carried out by use of chromic acid in the presence of acetic acid, it is preferable that the chromic acid may be used in 2 - 3 times of the equimolar amount and that the reaction may be carried out at room temperature. An N-[γ-(3'-indolyl)propyl]-1,2,3,4-tetrahydroisoquinoline derivative is dissolved or suspended in the solvent and the oxidizing agent is added to the resulting solution or suspension with stirring. Generally, the reaction terminates within about 24 hours.

Where the oxidation is carried out by use of ozone, the reaction is preferably carried out at room temperature. An N-[γ-(3'-indolyl)propyl]-1,2,3,4-tetrahydroisoquinoline derivative is dissolved or suspended in a solvent such as formic acid, acetic acid, carbon tetrachloride or the like and ozonized oxygen is bubbled into the solution or suspension with stirring.

The desired N-(γ-benzoylpropyl)-1,2,3,4-tetrahydroisoquinoline derivative can be separated from the reaction mixture in a crude form by extraction, with or without prior neutralization, and by evaporation to dryness. The product is further purified, if desired, by recrystallization from a suitable solvent such as ethanol, isopropanol or the like in a standard manner.

The resulting N-(γ-benzoylpropyl)-1,2,3,4-tetrahydroisoquinoline derivative of the formula (XI) can be hydrolyzed to give a corresponding deacylated compound of the formula (XII), which has an amino or an N-alkylamino substituent at the ortho position of the benzoyl benzene ring. The hydrolysis is accomplished under acidic or alkaline condition according to an ordinary hydrolysis procedure.

N-(γ-benzoylpropyl)-1,2,3,4-tetrahydroisoquinoline of a type represented by the formula (XIII), where the ortho substituent represented by Y of the benzoyl benzene ring is a hydrogen or halogen atom, is prepared by diazotization of the aboveobtained ortho-amino compound of the formula (XII) wherein $R^4$ is hydrogen, and subsequent treatment of the resulting diazonium compound with a suitable agent to replace the diazonium group by a hydrogen or halogen atom.

The diazotization is performed by a conventional method and the replacement reaction is conducted as follows.

By treating the diazonium compound with copper powder, fluoroboric acid or a metal salt such as cuprous chloride, cuprous bromide, potassium iodide, mercuric halide and the like, there can be obtained N-(γ-benzoylpropyl)-1,2,3,4-tetrahydroisoquinoline of the formula (XIII) wherein Y is a halogen atom.

By treating the diazonium compound with a reducing agent such as ethanol, hypophosphorous acid, alkaline formaldehyde, sodium stannite and the like, there can be obtained N-(γ-benzoylpropyl)-1,2,3,4-tetrahydroisoquinoline of the formula (XIII) wherein Y is a hydrogen atom.

The foregoing statement is a general description, and in order to explain the diazotization and the replacement reaction more clearly, a few reaction schemes will be shown as follows:

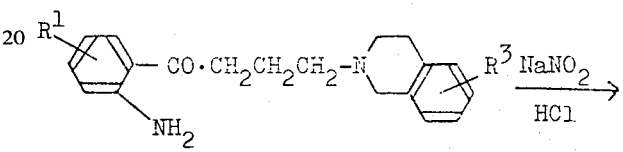

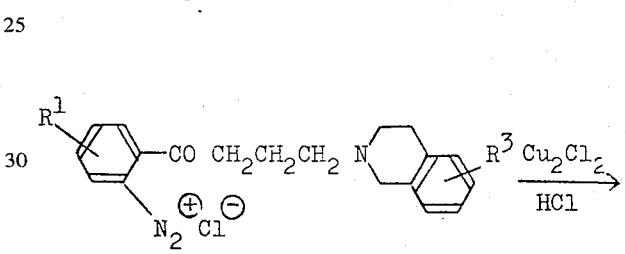

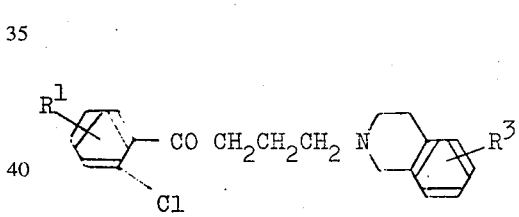

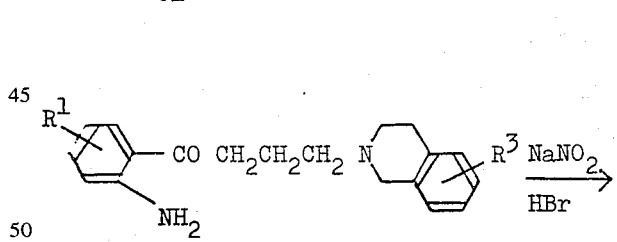

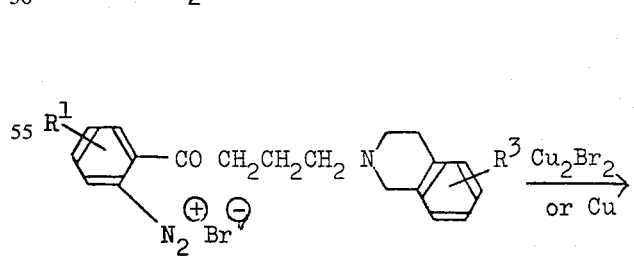

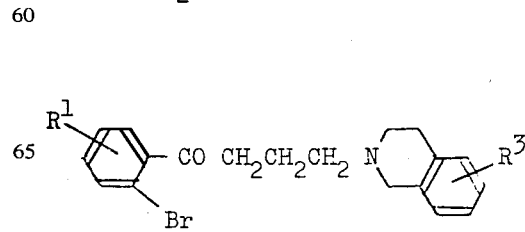

dicyclohexylcarbodiimide and the like in a suitable inert organic solvent such as tetrahydrofuran, ether, dioxane, benzene, toluene, chloroform, dimethylformamide and the like. The mixed acid anhydride mentioned above includes those prepared by treating with ethyl chloroformate, isobutyl chloroformate or the like.

According to the method mentioned above, the following compounds can be easily obtained.

2-[β(2'-Methyl-3'-indolyl)propionyl]-1,2,3,4-tetrahydroisoquinoline
2-[β-(2'-Methyl-6'-fluoro-3'-indolyl)propionyl]-1,2,3,4-tetrahydroisoquinoline
2-[β-(2'-Methyl-5'-fluoro-3'-indolyl)propionyl]-1,2,3,4-tetrahydroisoquinoline
2-[β-(1',2'-Dimethyl-6'-fluoro-3'-indolyl)propionyl]-1,2,3,4-tetrahydroisoquinoline
2-[β-(1',2'-Dimethyl-5'-fluoro-3'-indolyl)propionyl]-1,2,3,4-tetrahydroisoquinoline
2-[β-(1'-Methyl-6'-fluoro-3'-indolyl)propionyl]-1,2,3,4-tetrahydroisoquinoline
2-[β(1'-Ethyl-2'-methyl-6'-fluoro-3'-indolyl)propionyl]-1,2,3,4-tetrahydroisoquinoline
2-[β(2'-Methyl-6'-fluoro-3'-indolyl)propionyl]-6-chloro-1,2,3,4-tetrahydroisoquinoline
2-[β-(2'-Methyl-6'-fluoro-3'-indolyl)propionyl]-6-methoxy-1,2,3,4-tetrahydroisoquinoline
2-[β-(2'-Methyl-6'-fluoro-3'-indolyl)propionyl]-6-methyl-1,2,3,4-tetrahydroisoquinoline
2-[β-(2'-Methyl-6'-fluoro-3'-indolyl)propionyl]-7-chloro-1,2,3,4-tetrahydroisoquinoline
2-[β-(2'-Methyl-6'-fluoro-3'-indolyl)propionyl]-7-methoxy-1,2,3,4-tetrahydroisoquinoline
2-[β-(2'-Methyl-6'-fluoro-3'-indolyl)propionyl]-7-methyl-1,2,3,4-tetrahydroisoquinoline
2-[β-(2'-Methyl-6'-fluoro-3'-indolyl)propionyl]-5-methoxy-1,2,3,4-tetrahydroisoquinoline
2-[β-(2'-Methyl-6'-fluoro-3'-indolyl)propionyl]-5-chloro-1,2,3,4-tetrahydroisoquinoline
2-[β-(2'-Methyl-6'-fluoro-3'-indolyl)propionyl]-6-fluoro-1,2,3,4-tetrahydroisoquinoline
2-[β-(2'-Methyl-5'-fluoro-3'-indolyl)propionyl]-6-methoxy-1,2,3,4-tetrahydroisoquinoline
2-[β-(2'-Methyl-5'-fluoro-3'-indolyl)propionyl]-6-chloro-1,2,3,4-tetrahydroisoquinoline
2-[β-(2'-Methyl-5'-fluoro-3'-indolyl)propionyl]-5-methoxy-1,2,3,4-tetrahydroisoquinoline
2-[β-(2'-Methyl-6'-chloro-3'-indolyl)propionyl]-1,2,3,4-tetrahydroisoquinoline
2-[β(2'-Methyl-6'-methoxy-3'-indolyl)propionyl]-1,2,3,4-tetrahydroisoquinoline
2-[β-(2',6'-Dimethyl-3'-indolyl)propionyl]-1,2,3,4-tetrahydroisoquinoline
2-[β-(2'-Methyl-5'-chloro-3'-indolyl)propionyl]-1,2,3,4-tetrahydroisoquinoline
2-[β-(2'-Methyl-5'-methoxy-3'-indolyl)propionyl]-1,2,3,4-tetrahydroisoquinoline
2-[β-(2',5'-Dimethyl-3'-indolyl)propionyl]-1,2,3,4-tetrahydroisoquinoline
2-[β-(2'-Methyl-6'-fluoro-3'-indolyl)propionyl]-8-chloro-1,2,3,4-tetrahydroisoquinoline The compounds of the formula (IX) thus obtained are converted to the corresponding N-[γ-(3'-indolyl)propyl]-1,2,3,4-tetrahydroisoquinoline derivatives of the formula (X) by reacting the former with a reducing agent. A reducing agent such as alkali metal in alcholic solvent, hydrogen in the presence of a catalyst, metal hydride and the like can be preferably employed. An electrolytic reduction can also be used for the purpose.

It is especially preferable to use metal hydride such as lithium aluminum hydride, diisobutyl aluminum hydride, triisopropyl aluminum hydride, boron hydride or the like, in an inert organic solvent such as, for example, ether, tetrahydrofuran, dioxane, N-ethylmorpholine and the like.

According to the method mentioned above, the following compounds can be obtained.
2-[γ-(2'-Methyl-3'-indolyl)propyl]-1,2,3,4-tetrahydroisoquinoline
2-[γ-(2'-Methyl-6'-fluoro-3'-indolyl)propyl]-1,2,3,4-tetrahydroisoquinoline
2-[γ-(2'-Methyl-5'-fluoro-3'-indolyl)propyl]-1,2,3,4-tetrahydroisoquinoline
2-[γ-(1',2'-Dimethyl-5'-fluoro-3'-indolyl)propyl]-1,2,3,4-tetrahydroisoquinoline
2-[γ-(1',2'-Dimethyl-6'-fluoro-3'-indolyl)propyl]-1,2,3,4-tetrahydroisoquinoline
2-[γ-(1'-Methyl-6'-fluoro-3'-indolyl)propyl]-1,2,3,4-tetrahydroisoquinoline
2-[γ-(1'-Ethyl-2'-methyl-6'-fluoro-3'-indolyl)propyl]-1,2,3,4-tetrahydroisoquinoline
2-[γ-(2'-Methyl-6'-fluoro-3'-indolyl)propyl]-6-chloro-1,2,3,4-tetrahydroisoquinoline
2-[γ-(2'-Methyl-6'-fluoro-3'-indolyl)propyl]-6-methoxy-1,2,3,4-tetrahydroisoquinoline
2-[γ-(2'-Methyl-6'-fluoro-3'-indolyl)propyl]-6-methyl1,2,3,4-tetrahydroisoquinoline
2-[γ(2'-Methyl-6'-fluoro-3'-indolyl)propyl]-7-chloro-1,2,3,4-tetrahydroisoquinoline
2-[γ-(2'-Methyl-6'-fluoro-3'-indolyl)propyl]-7-methoxy-1,2,3,4-tetrahydroisoquinoline
2-[γ-(2'-Methyl-6'-fluoro-3'-indolyl)propyl]-7-methyl-1,2,3,4-tetrahydroisoquinoline
2-[γ-(2'-Methyl-6'-fluoro-3'-indolyl)propyl]-5-methoxy-1,2,3,4-tetrahydroisoquinoline
2-[γ-(2'-Methyl-6'-fluoro-3'-indolyl)propyl]-5-chloro-1,2,3,4-tetrahydroisoquinoline
2-[γ-(2'-Methyl-6'-fluoro-3'-indolyl)propyl]-6-fluoro-1,2,3,4-tetrahydroisoquinoline
2-[γ-(2'-Methyl-5'-fluoro-3'-indolyl)propyl]-6-methoxy-1,2,3,4-tetrahydroisoquinoline
2-[γ-(2'-Methyl-5'-fluoro-3'-indolyl)propyl]-6-chloro-1,2,3,4-tetrahydroisoquinoline
2-[γ-(2'-Methyl-5'-fluoro-3'-indolyl)propyl]-5-methoxy-1,2,3,4-tetrahydroisoquinoline
2-[γ-(2'-Methyl-6'-chloro-3'-indolyl)propyl[-1,2,3,4-tetrahydroisoquinoline
2-[γ-(2'-Methyl-6'-methoxy-3'-indolyl)propyl]-1,2,3,4-tetrahydroisoquinoline
2-[γ-(2',6'-Dimethyl-3'-indolyl)propyl[-1,2,3,4-tetrahydroisoquinoline
2-[γ-(2'-Methyl-5'-chloro-3'-indolyl)propyl]-1,2,3,4-tetrahydroisoquinoline
2-[γ-(2'-Methyl-5'-methoxy-3'-indolyl)propyl]-1,2,3,4-tetrahydroisoquinoline
2-[γ-(2',5'-Dimethyl-3'-indolyl)propyl]-1,2,3,4-tetrahydroisoquinoline
2-[γ-(2'-Methyl-6'-fluoro-3'-indolyl)propyl]-8-chloro-1,2,3,4-tetrahydroisoquinoline These compounds can be converted to the corresponding inorganic or organic acid addition salts by a procedure known in the art.

N-(γ-Benzoylpropyl)-1,2,3,4-tetrahydroisoquinoline of a type represented by the formula (XI), which has an acylamino or N-alkylacylamino substituent at the

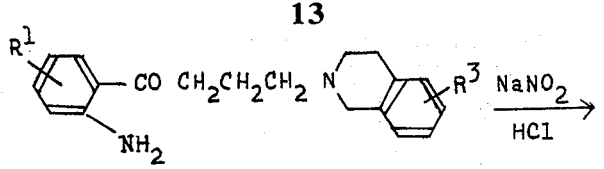

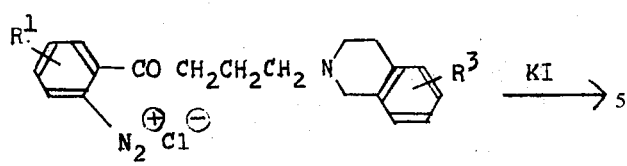

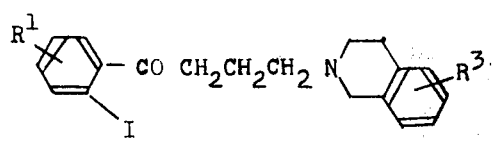

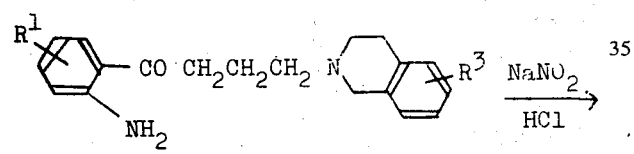

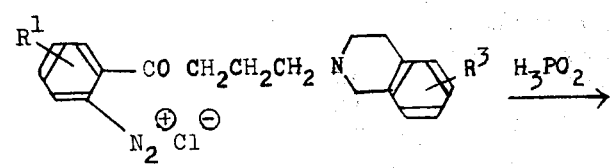

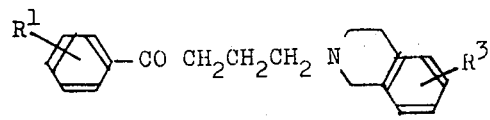

(In the above formulae, R¹ and R³ have the same meanings as defined above.)

According to the methods mentioned above, the following compounds can be easily synthesized:

2-[γ-(2'-Acetylaminobenzoyl)propyl]-1,2,3,4-tetrahydroisoquinoline
2-[γ-(2'-Aminobenzoyl)propyl]-1,2,3,4-tetrahydroisoquinoline
2-[γ-(2'-N-Methylacetylaminobenzoyl)propyl]-1,2,3,4-tetrahydroisoquinoline
2-[γ-(2'-Methylaminobenzoyl)propyl]-1,2,3,4-tetrahydroisoquinoline
2-[γ-(2'-Ethylaminobenzoyl)propyl]-1,2,3,4-tetrahydroisoquinoline
2-[γ-(2'-Isopropylaminobenzoyl)propyl]-1,2,3,4-tetrahydroisoquinoline
2-(γ-Benzoylpropyl)-1,2,3,4-tetrahydroisoquinoline
2-[γ-(2'-Chlorobenzoyl)propyl]-1,2,3,4-tetrahydroisoquinoline
2-[γ-(2'-Bromobenzoyl)propyl]-1,2,3,4-tetrahydroisoquinoline
2-[γ-(2'-Iodobenzoyl)propyl]-1,2,3,4-tetrahydroisoquinoline
2-[γ-(2'-Acetylamino-5'-fluorobenzoyl)propyl]-1,2,3,4-tetrahydroisoquinoline
2-[γ-(2'-Amino-5'-fluorobenzoyl)propyl]-1,2,3,4-tetrahydroisoquinoline
2-[γ-(5'-Fluorobenzoyl)propyl]-1,2,3,4-tetrahydroisoquinoline
2-[γ-(2'-Chloro-5'-fluorobenzoyl)propyl]-1,2,3,4-tetrahydroisoquinoline
2-[γ-(2'-Acetylamino-4'-fluorobenzoyl)propyl[-1,2,3,4-tetrahydroisoquinoline
2-[γ-(2'-Amino-4'-fluorobenzoyl)propyl]-1,2,3,4-tetrahydroisoquinoline
2-[γ-(2'-Chloro-4'-fluorobenzoyl)propyl]-1,2,3,4-tetrahydroisoquinoline
2-[γ-(2'-Bromo-4'-fluorobenzoyl)propyl]-1,2,3,4-tetrahydroisoquinoline
2-[γ-(4'-Fluorobenzoyl)propyl]-1,2,3,4-tetrahydroisoquinoline
2-[γ-(2'-Acetylamino-5'-fluorobenzoyl)propyl]-5-methoxy-1,2,3,4-tetrahydroisoquinoline
2-[γ-(2'-Amino-5'-fluorobenzoyl)propyl]-5-chloro-1,2,3,4-tetrahydroisoquinoline
2-[γ-(2'-Chloro-5'-fluorobenzoyl)propyl]-6-chloro-1,2,3,4-tetrahydroisoquinoline
2-[γ-(2'-Chloro-5'-fluorobenzoyl)propyl]-6-methoxy-1,2,3,4-tetrahydroisoquinoline
2-[γ-(2'-Chloro-4'-fluorobenzoyl)propyl]-6-methoxy-1,2,3,4-tetrahydroisoquinoline
2-[γ-(5'-Fluorobenzoyl)propyl]-6-methoxy-1,2,3,4-tetrahydroisoquinoline
2-[γ-(5'-Fluorobenzoyl)propyl]-6-methyl-1,2,3,4-tetrahydroisoquinoline
2-[γ-(5'-Fluorobenzoyl)propyl]-7-chloro-1,2,3,4-tetrahydroisoquinoline
2-[γ-(5'-Fluorobenzoyl)propyl]-6-hydroxy-1,2,3,4-tetrahydroisoquinoline
2-[γ-(2'-Chloro-4'-fluorobenzoyl)propyl]-6-chloro-1,2,3,4-tetrahydroisoquinoline
2-[γ-(4'-Fluorobenzoyl)propyl]-6-chloro-1,2,3,4-tetrahydroisoquinoline
2-[γ-(4'-Chlorobenzoyl)propyl]-1,2,3,4-tetrahydroisoquinoline
2-[γ-(4'-Methoxybenzoyl)propyl]-1,2,3,4-tetrahydroisoquinoline
2-[γ-(4'-Methoxybenzoyl)propyl]-1,2,3,4-tetrahydroisoquinoline
2-[γ-(4'-Trifluoromethylbenzoyl)propyl]-1,2,3,4-tetrahydroisoquinoline
2-[γ-(2',4'-Dichlorobenzoyl)propyl]-1,2,3,4-tetrahydroisoquinoline
2-[γ-(2'-Bromo-4'-chlorobenzoyl)propyl]-1,2,3,4-tetrahydroisoquinoline 2-[γ-(2'-Bromo-5'-chlorobenzoyl)propyl]-1,2,3,4-tetrahydroisoquinoline Thus obtained compounds of the formulae (XI), (XII) and (XIII) can be converted to the corresponding organic or inorganic acid addition salts by a usual manner. These salts include pharmaceutically acceptable acid addition salts, e.g. hydrochloride, fumarate, formate, acetate, lactate, citrate, sulfonate, maleate, tartrate, methane sulfonate, salicylate, hydrosulfate and the like.

The present invention also provides a novel pharmaceutical composition containing one or more of the compounds represented by the formula (I) as the effective ingredient.

Each of these pharmaceutically active compounds may be, e.g., incorporated, for oral administration, in tablet as the sole active ingredient.

A typical tablet is constituted by from 1 to 2 per cent of a binder, e.g. tragacanth; from 3 to 10 per cent of a lubricant, e.g. talcum; from 0.25 to 1.0 per cent of a lubricant, e.g. magnesium stearate; an average dose of active ingredient; and q.s. 100 percent of a filler, e.g. lactose. The usual oral dosage is 1 – 100 mg per os daily.

The present inventors prepared a number of N-substituted 1,2,3,4-tetrahydroisoquinoline derivatives and evaluated the pharmaceutical effects thereof by animal tests, and found that many derivatives of the type represented by the formula (I) are superior to conventional drugs.

The pharmacological evaluation of the compounds of the formula (I) has demonstrated that they possess a variety of depressant actions on the central nervous system. Some of the present compounds are more effective on conditioned avoidance response in rats than chlorpromazine, one of the most widely used major tranquilizers in the world. They also possess anti-apomorphine and anti-methamphetamine effects greater than those of chlorpromazine.

While the compounds of the present invention have many beneficial activities, there is scarcely shown any toxic symptoms, and it may safely be said that these compounds are of great value in practical use.

The following specific Examples are given to illustrate the present invention more particularly.

EXAMPLE 1

A. Preparation of the starting material — To a solution of 0.05 mole of β-(4-fluorobenzoyl)propionic acid and 0.05 mole of triethylamine in 100 ml of tetrahydrofuran was added dropwise 0.05 mole of ethyl chlorocarbonate with stirring at −5°C. Stirring was continued for 30 minutes at a temperature below 0°C, and there was added dropwise a solution of 0.05 mole of 1,2,3,4-tetrahydroisoquinoline in 20 ml of tetrahydrofuran.

The reaction mixture was allowed to stand overnight at a room temperature and filtered. The filtrate was evaporated under reduced pressure and the residue was recrystallized from aqueous ethanol to yield 2-[β-(4'-fluorobenzoyl)propionyl]-1,2,3,4-tetrahydroisoquinoline, melting at 95° – 96°C.

B. To a stirred mixture of 2.4 g of lithium aluminum hydride and 40 ml of tetrahydrofuran was added dropwise a solution of 5.5 g of 2-[β-(4'-fluorobenzoyl)propionyl]-1,2,3,4-tetrahydroisoquinoline in 60 ml of tetrahydrofuran. After the addition was complete, the mixture was heated under reflux for 3 hours and then cooled with ice. Thereto was added dropwise 15 ml of cold water, and precipitate formed was filtered off. The solvent was distilled off from the filtrate. The thus obtained residue was extracted with 120 ml of ether.

The ethereal extract was washed with water, dried over anhydrous sodium sulfate and evaporated to dryness. As a residue, there was obtained 2-[δ-(4'-fluorophenyl)-δ-hydroxybutyl]-1,2,3,4-tetrahydroisoquinoline, which was treated with methanolic hydrogen chloride to give the hydrochloride, melting at 144° – 146°C.

C. To a stirred solution of 3 g of 2-[δ-(4'-fluorophenyl)-δ-hydroxybutyl]-1,2,3,4-tetrahydroisoquinoline in 60 ml of benzene was added 10 g of finely powdered manganese dioxide in portions. The mixture was stirred for 5 hours at a room temperature and filtered. The filtrate was evaporated under reduced pressure and the residue was recrystallized from isopropanol to yield 2-[γ-(4-fluorobenzoyl)propyl]-1,2,3,4-tetrahydroisoquinoline melting at 79° – 80°C, whose hydrochloride melting at 208° – 210°C.

Example 2

To a stirred mixture of 4.4 g of 2-[δ-(2'-acetylaminophenyl)-δ-hydroxybutyl]-1,2,3,4-tetrahydroisoquinoline and 60 ml of acetone was added dropwise a chromic acid solution (prepared from 2 g of chromic anhydride, 10 ml of water and 2 ml of sulfuric acid) under cooling with ice. The mixture was stirred at a room temperature for 2 hours, poured into 440 ml of cold water, made alkaline by addition of a 40% aqueous sodium hydroxide solution and extracted with 200 ml of chloroform. The extract was washed with water, dried over anhydrous sodium sulfate and evaporated. The residue was treated with methanolic hydrogen chloride to give 2-[γ-(2'-acetylaminobenzoyl)propyl]-1,2,3,4-tetrahydroisoquinoline hydrochloride, melting at 230° – 231°C.

EXAMPLE 3

To a stirred solution of 4-fluorophenyl magnesium bromide, prepared in the usual manner from 0.5 g. of magnesium and 3.5 g of 4-fluorobromobenzene in 40 ml of ether, was added dropwise a solution of 4 g of 2-(γ-cyanopropyl)-1,2,3,4-tetrahydroisoquinoline in 20 ml of ether under gentle reflux. Stirring and refluxing was continued for 6 hours. After cooling, the reaction mixture was treated with 100 of 6N hydrochloric acid.

The aqueous layer was separated, heated to 100°C and allowed to cool.

The resulting aqueous solution was made alkaline by a slow addition of a 40% sodium hydroxide solution and the whole was extracted with 100 ml of chloroform. The extract was washed with water, dried over anhydrous sodium sulfate and evaporated to dryness.

Recrystallization of the residue from isopropanol gave 2-[γ-(4'-fluorobenzoyl)propyl]-1,2,3,4-tetrahydroisoquinoline, melting at 79° – 80°C.

EXAMPLE 4

To a solution of 1 g of 2-[γ-(4'-fluorobenzoyl)propyl]-1,2,3,4-tetrahydroisoquinoline in 20 ml of isopropanol was added 0.2 g of sodium borohydride. The mixture was boiled for 5 minutes, cooled, and poured into 200 ml of water and the whole was extracted with 200 ml of ether. The ethereal extract was washed thoroughly with water, dried over anhydrous sodium sulfate and filtered. The filtrate was saturated with anhydrous hydrogen chloride to produce a crystalline solid mass, which was recrystallized from isopropanol to yield 2-[δ-(4'-fluorophenyl)-δ-hydroxybutyl]-1,2,3,4-tetrahydroisoquinoline hydrochloride, melting at 144° – 146°C.

EXAMPLE 5

A. To a stirred solution of 5.0 g of β-(2-methyl-3-indolyl)propionic acid and 2.5 g of triethylamine in 30 ml of tetrahydrofuran was added dropwise a solution of 2.7 g of ethyl chloroformate in 20 ml of tetrahydrofuran at a temperature below 0°C. The stirring was continued for additional 15 minutes below 0°C and thereto was added dropwise a solution of 3.4 g of 1,2,3,4-tetrahydroisoquinoline in 30 ml of tetrahydrofuran. After addition was completed, the reaction mixture was stirred for 3 hours at a room temperature, the precipitated triethylamine hydrochloride was filtered off and the tetrahydrofuran was removed by distillation under pressure. The oily residue was dissolved in 200 ml of benzene and the benzene solution was washed successively with a 10 % aqueous hydrochloric acid solution, water, a 10 % aqueous sodium hydroxide solution, and finally a saturated aqueous sodium chloride solution. After the benzene solution was dried over anhydrous sodium sulfate and evaporated to dryness under reduced pressure, the solid residue obtained was recrystallized from ethanol to yield 5.5 g of 2-[β-(2'-methyl-3'-indolyl)propionyl]-1,2,3,4-tetrahydroisoquinoline, melting at 136.0° – 137.0°C.

B. To a stirred mixture of 2.9 g of lithium aluminum hydride and 30 ml of anhydrous ether was added dropwise a solution of 8.2 g of 2-[β-(2'-methyl-3'-indolyl)propionyl]-1,2,3,4-tetrahydroisoquinoline in 70 ml of anhydrous tetrahydrofuran over a period of 40 minutes under gentle reflux. Stirring and refluxing were continued for additional 5 hours and the reaction mixture was added dropwise with a mixture of moist ether (100 ml) and tetrahydrofuran (100 ml) and then with 20 ml of water under cooling with ice-bath. The resulting precipitate was filtered off and the filtrate was evaporated to dryness. Recrystallization of the residue from cyclohexane gave 5.0 g of 2-[γ-(2'-methyl-3'-indolyl)propyl]-1,2,3,4-tetrahydroisoquinoline having a melting point of 116.5° – 117.0°C.

C. A solution of 8.0 g of 2-γ-(2'-methyl-3'-indolyl)propyl]-1,2,3,4-tetrahydroisoquinoline in 120 ml of acetic acid was bubbled with oxygen gas containing 3 – 4% ozone at a temperature of 15° – 20°C. While bubbling was continued for 30 minutes, the reaction mixture became dark red and then gradually discolored. After the reaction mixture was made alkaline by addition of an about 15 % aqueous solution of ammonium hydroxide, it was extracted with ethyl acetate. The extract was washed with water and evaporated to an oily residue. The residual oil was treated with anhydrous hydrogen chloride in ether to give crystalline powder of 2-[γ-(2'-acetylaminobenzoyl)propyl]-1,2,3,4-tetrahydroisoquinoline hydrochloride, which was recrystallized from isopropyl alcohol. Melting point: 201.5° – 203.0°C. (decomposition).

EXAMPLE 6

A solution of 3.0 g of 2-[γ-(2'-acetylaminobenzoyl)propyl]-1,2,3,4-tetrahydroisoquinoline hydrochloride and 30 ml of an about 9 % (wt./vol.) hydrogen chloride-ethanol solution was heated under reflux for 3 hours. After ethanol was evaporated to dryness, the residual powder was recrystallized from ethanol to give 2-[γ-(2'-aminobenzoyl)propyl]-1,2,3,4-tetrahydroisoquinoline monohydrochloride, melting at 230° – 231°C (decomposition).

EXAMPLE 7

To a cooled solution of 6.6 g of 2-[γ-(2'-aminobenzoyl)propyl]-1,2,3,4-tetrahydroisoquinoline monohydrochloride in 150 ml of 1 N-hydrochloric acid was added dropwise a solution of 1.4 g of sodium nitrite in 10 ml of water with stirring below 0°C. After stirring for additional 45 minutes below 0°C, the resulting cold diazonium salt solution was added to a cold solution of 40 ml of a 50 % aqueous solution of hypophosphorous acid with vigorous stirring. After stirring for 2 hours under cooling below 0°C, the mixture was kept in a refrigerator overnight. The reaction mixture was made alkaline by addition of a 10 % aqueous sodium hydroxide solution and extracted with ether. The ethereal extract was washed with water, dried over anhydrous sodium sulfate and evaporated to dryness. The residual crystalline solid was recrystallized from 80 % aqueous ethanol to give 2-(γ-benzoylpropyl)-1,2,3,4-tetrahydroisoquinoline, melting at 64.0° – 66.5°C.

This substance was treated with anhydrous hydrogen chloride in ether to give crystalline powder of 2-(γ-benzoylpropyl)-1,2,3,4-tetrahydroisoquinoline hydrochloride, which was recrystallized from isopropyl alcohol. Melting point: 186.5°C.

EXAMPLE 8

A. Substitution of an equimolar amount of β-(2-methyl-5-fluoro-3-indolyl)propionic acid for the β-(2-methyl-3-indolyl)propionic acid in the step (A) of Example 5 yielded 2-[β-(2'-methyl-5'-fluoro-3'-indolyl)propionyl]-1,2,3,4-tetrahydroisoquinoline.

B. Substitution of an equimolar amount of 2-[β-(2'-methyl-5'-fluoro-3'-indolyl)propionyl]-1,2,3,4-tetrahydroisoquinoline for the 2-[β-(2'-methyl-3'-indolyl)propionyl]-1,2,3,4-tetrahydroisoquinoline in the step (B) of Example 5 yielded 2-[γ-(2'-methyl-5'-fluoro-3'-indolyl)propyl]-1,2,3,4-tetrahydroisoquinoline, which was recrystallized from benzene, melting at 149.0° – 150.0°C.

C. Substitution of an equimolar amount of 2-[γ-(2'-methyl-5'-fluoro-3'-indolyl)propyl]-1,2,3,4-tetrahydroisoquinoline for the 2-[γ-(2'-methyl-3'-indolyl)propyl]-1,2,3,4-tetrahydroisoquinoline in the step (C) of Example 5 yielded 2-[γ-(2'-acetylamino-5'-fluorobenzoyl)propyl]-1,2,3,4-tetrahydroisoquinoline hydrochloride melting at 223.5° – 225.0°C (decomposition).

EXAMPLE 9

A solution of 5.5 g of 2-[γ-(2'-acetylamino-5'-fluorobenzoyl)propyl]-1,2,3,4-tetrahydroisoquinoline hydrochloride and 5 ml of concentrated hydrochloric acid in 25 ml of ethanol was heated under reflux for 3 hours. After cooling, the reaction mixture was diluted with ice-water and made alkaline with a 10 % aqueous sodium hydroxide solution and the whole was extracted with ether. The ethereal extract was washed with water and evaporated to a solid residue, which was recrystallized from aqueous ethanol to give 2-[γ-(2'-amino-5'-fluorobenzoyl)propyl]-1,2,3,4-tetrahydroisoquinoline melting at 91.0° – 92.0°C.

EXAMPLE 10

To a cooled solution of 7.8 g of 2-[γ-(2'-amino-5'-fluorobenzoyl)propyl]-1,2,3,4-tetrahydroisoquinoline in 150 ml of 2 N-hydrochloric acid was added a solution of 1.73 g of sodium nitrite in 10 ml of water with stirring below 0°C. The resulting diazonium salt solution was added to a cooled suspension of 2.8 g of cuprous chloride in 25 ml of concentrated hydrochloric acid with vigorous stirring. The stirring was continued for 30 minutes below 0°C, and then for additional 1 hour at a room temperature, finally for 3 hours at 50° – 60°C. After cooling, the reaction mixture was made alkaline by addition of aqueous ammonium hydroxide and extracted with ether. The ethereal extract was washed with water, dried over anhydrous sodium sulfate and evaporated to give oily 2-[γ-(2'-chloro-5'-fluorobenzoyl)propyl]-1,2,3,4-tetrahydroisoquinoline. The oily product was treated with hydrogen chloride in ether to give the hydrochloride, melting point: 152° – 154°C (decomp.).

EXAMPLE 11

Substitution of an equimolar amount of 2-[γ-(2'-amino-5'-fluorobenzoyl)propyl]-1,2,3,4-tetrahydroisoquinoline for the 2-[γ-(2'-aminobenzoyl)propyl]-1,2,3,4-tetrahydroisoquinoline monohydrochloride in Example 7 yielded 2-[γ-(3'-fluorobenzoyl)propyl]-1,2,3,4-tetrahydroisoquinoline hydrochloride, melting at 180.0° – 182.0°C (decomposition).

EXAMPLE 12

To a solution of 1.5 g of lithium aluminum hydride in 70 ml of tetrahydrofuran was introduced a solution of 6.8 g of 2-[β-(4'-fluorobenzoyl)-propionyl]-6-methoxy-1,2,3,4-tetrahydroisoquinoline in 100 ml of tetrahydrofuran over one hour. After refluxing for an additional 2 hours, sufficient water was added dropwise with ice-cooling to decompose the excess hydride and the resulting precipitate was filtered off. The filtrate was dried over anhydrous sodium sulfate and evaporated to give 5.8 g of 2-[δ-hydroxy-δ-(4'-fluorophenyl)-butyl]-6-methoxy-1,2,3,4-tetrahydroisoquinoline as an oil.

EXAMPLE 13

The oxidizing reagent was prepared from 1.9 g of chromium trioxide, 6.0 g of water, and 3.0 g of concentrated sulfuric acid. On the other hand, 5.8 g of 2-[δ-hydroxy-δ-(4'-fluorophenyl)-butyl]-6-methoxy-1,2,3,4-tetrahydroisoquinoline was dissolved in 70 ml of acetone and cooled with ice, and to this was added with stirring the above oxidizing reagent over 30 minutes below 5°C. After stirring for 2 hours below 10°C and for 1 hour at room temperature, a 10 % alkaline solution was added and acetone was evaporated under reduced pressure. The residual solution was extracted with ethyl acetate, washed with water, dried and evaporated. The residue was treated with ethereal hydrogen chloride and the precipitate was recrystallized from alcohol to give 5.1 g of 2-[δ-(4'-fluorobenzoyl)propyl]-6-methoxy-1,2,3,4-tetrahydroisoquinoline hydrochloride, melting point: 203° – 204°C.

EXAMPLE 14

A mixture of 2.7 g of 6-methoxy-1,2,3,4-tetrahydroisoquinoline, 3.3 g of γ-chloro-4-fluorobutyrophenone, 3.0 g of anhydrous potassium carbonate, and 100 ml of N,N-dimethylformamide was refluxed for 3 days and then filtered while hot. The filtrate was evaporated and the residue was dissolved in ethanol. Dry hydrogen chloride was passed through the solution and then ether was added portionwise thereto. Then, 2-(γ-(4'-fluorobenzoyl)propyl]-6-methoxy-1,2,3,4-tetrahydroisoquinoline hydrochloride (4.0 g) was obtained. Recrystallization from alcohol gave crystals having a melting point of 203° – 204°C.

EXAMPLE 15

2-[γ-(4'-Fluorobenzoyl)-propyl]-6-methoxy-1,2,3,4-tetrahydroisoquinoline hydrochloride (1.0 g) was dissolved in 50 ml of methanol and to this solution was added 500 mg of sodium borohydride with stirring. After stirring for an additional 2 hours, the mixture was evaporated, diluted with water, and extracted with chloroform. The extract was evaporated and the residual oil was dissolved in ether and dry hydrogen chloride was passed through. The precipitate was collected and recrystallized from isopropanolether to give 0.9 g of 2-[δ-hydroxy-δ-(4'-fluorophenyl) butyl]-6-methoxy-1,2,3,4-tetrahydroisoquinoline hydrochloride, melting point: 113° – 115°C.

EXAMPLE 16

To a solution of 1.0 g of lithium aluminum hydride in 50 ml of tetrahydrofuran was introduced a solution of 4.3 g of 2-[3-(4'-fluorobenzoyl)-propionyl]-6-methyl-1,2,3,4-tetrahydroisoquinoline in 70 ml of tetrahydrofuran over 1 hour. After refluxing for an additional 2 hours, sufficient water was added dropwise with ice-cooling to decompose the excess hydride. The resulting precipitate was filtered off. The filtrate was dried over anhydrous sodium sulfate and evaporated to yield 3.9 g of 2-[δ-hydroxy-δ-(4'-fluorophenyl)-butyl]-6-methyl-1,2,3,4-tetrahydroisoquinoline as an oil.

EXAMPLE 17

An oxidizing reagent was prepared from 1.3 g of chromium trioxide, 4.0 g of water, and 2.0 g of concentrated sulfuric acid. On the other hand, 3.9 g of 2-[δ-hydroxy-δ-(4'-fluorophenyl)-butyl]-6-methyl-1,2,3,4-tetrahydroisoquinoline was dissolved in 70 ml of acetone and cooled with ice, and thereto was added with stirring the above-mentioned oxidizing reagent over 30 minutes below 5°C. After stirring for 2 hours below 10°C and for 1 hour at room temperature, a 10 % alkaline solution was added and acetone was evaporated under reduced pressure. The residual solution was extracted with ethyl acetate, washed with water, dried and evaporated. The residue was treated with ethereal hydrogen chloride and the precipitate was recrystallized from alcohol to give 3.4 g of 2-[γ-(4'-fluorobenzoyl)-propyl]-6-methyl-1,2,3,4-tetrahydroisoquinoline hydrochloride, melting point: 200° – 201°C.

EXAMPLE 18

A mixture of 1.4 g of 6-methyl-1,2,3,4-tetrahydroisoquinoline, 1.6 g of γ-chloro-4-fluorobutyrophenone, 1.5 g of anhydrous potassium carbonate, and 50 ml of N,N-dimethylformamide was refluxed for 70 hours and filtered while hot. The filtrate was evaporated and the residue was dissolved in alcohol. Dry hydrogen chloride was passed through and then ether was added dropwise to precipitate the salt. The thus obtained crude 2-[γ-(4'-fluorobenzoyl)propyl]-6-methyl-1,2,3,4-tetrahydroisoquinoline (2.0 g) was recrystallized from alcohol, melting point: 200° – 201°C.

EXAMPLE 19

Sodium borohydride (150 mg) was added to a solution of 0.4 g of 2-[γ-(4'-fluorobenzoyl)-propyl]-6-methyl-1,2,3,4-tetrahydroisoquinoline hydrochloride in 30 ml of methanol. After stirring for 2 hours, the mixture was evaporated, diluted with water and extracted with chloroform. The extract was dried and evaporated. The residual oil was dissolved in ether and dry hydrogen chloride was passed therethrough. The precipitate was recrystallized from ethanol-ether to give 0.3 g of 2-[δ-hydroxy-δ-(4-fluorophenyl)-butyl]-6-methyl-1,2,3,4-tetrahydroisoquinoline hydrochloride, melting point: 168° – 170°C.

EXAMPLE 20

By a method similar to that mentioned in Example 3, the following compounds were obtained.

2-[γ-(4'-fluorobenzoyl)propyl]-6-methoxy-1,2,3,4-tetrahydroisoquinoline (Yield: 61 %). Melting point of its hydrochloride: 201° – 203°C.

2-[γ-(4'-fluorobenzoyl)propyl]-6-methyl-1,2,3,4-tetrahydroisoquinoline (Yield: 59 %). Melting point of its hydrochloride: 166.5° – 169.0°C.

What is claimed is:
1. The compound 2[γ-(2″)aminobenzoyl)propyl]-1,2,3,4-tetrahydroisoquinoline monohydrochloride.
2. The compound 2-[γ-(2-acetylaminobenzoyl)propyl]-1,2,3,4 tetrahydroisoquinoline hydrochloride.

* * * * *